Figure 1:
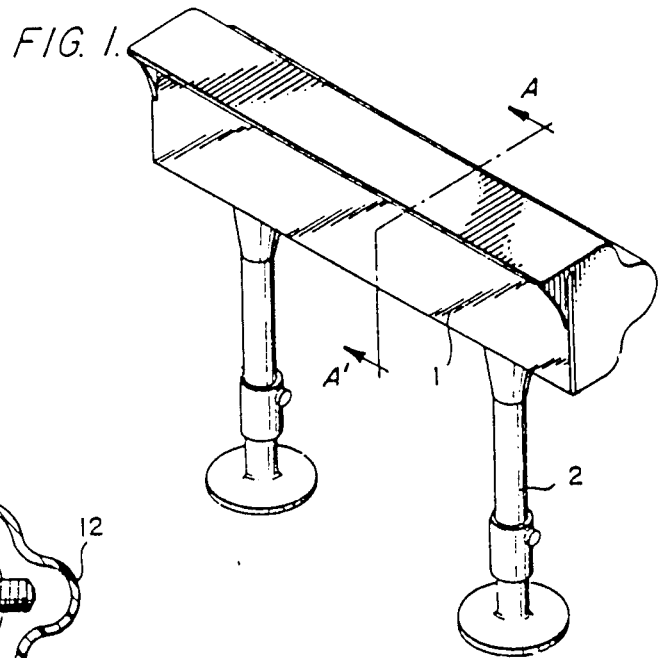

United States Patent [19]

Her

[11] Patent Number: 4,464,649
[45] Date of Patent: Aug. 7, 1984

[54] ELECTRONIC BRAKING ALARM INDICATOR FOR AUTOMOBILES

[76] Inventor: Winn Shin Her, 15, Chien Ming Rd., Win Lin Li, Peitou District, Taipei, Taiwan

[21] Appl. No.: 350,701

[22] Filed: Feb. 22, 1982

[51] Int. Cl.³ .............................................. B60Q 1/26
[52] U.S. Cl. ...................................... 340/72; 340/71; 340/66; 340/84; 340/87; 340/90; 340/107; 340/321; 307/10 LS
[58] Field of Search ....................... 340/72, 71, 69, 66, 340/67, 73, 74, 84, 87, 107, 90, 321; 307/10 LS

[56] References Cited

U.S. PATENT DOCUMENTS

| | | | |
|---|---|---|---|
| 3,320,586 | 5/1967 | Wagner | 340/66 |
| 3,395,388 | 7/1968 | Hendrickson | 340/66 |
| 3,492,638 | 1/1970 | Lane | 340/69 |
| 3,678,457 | 7/1972 | Lev | 340/107 |
| 3,750,138 | 7/1973 | Burgan et al. | 340/87 |

*Primary Examiner*—Donnie L. Crosland
*Attorney, Agent, or Firm*—Karl W. Flocks; Sheridan Neimark

[57] ABSTRACT

An electronic braking alarm indicator for automobiles that will achieve in flash alarming effects in conjunction with braking signals in case of braking actions of the automobile concerned and will send out emergency signals for help in case of clash or other car incidents whatever.

7 Claims, 3 Drawing Figures

U.S. Patent   Aug. 7, 1984   4,464,649

ELECTRONIC BRAKING ALARM INDICATOR FOR AUTOMOBILES

SUMMARY OF THE INVENTION

Collision to the preceding traffic by the succeeding traffic accounts for quite a number of car incidents, al-though 'Keep at safe distance' is a good principle to follow to avoid collision of traffic going in the same direction, the safe distance that should be kept by the following traffic would likely be violated when the preceding traffic is not provided with a competent braking warning system to admonish the succeeding driver to take braking actions in time, tail-and-head collision would still occur as the case may be. We could put it this way, the prevailing saying that a spacing of six bodies at 60 Km per hour or of nine bodies at 90 Km per hour will roughly provide a safe separation is actually based on the experimentation and calculation under the premise supposing that the driver of the number two traffic is prepared to acknowledge the braking signals of the number one traffic anytime, thus, if the number two driver is not in a position to learn of the braking action of the number one traffic at all times, then longitudinal collision would still have a chance to take place at or beyond the presumed safety distance as related above. As the fact stands, the driver of the succeeding traffic is obliged to pay attention to a number of other factors besides the status quo of the number one traffic, such as conditions of the lateral lanes, the road conditions, which all together would greatly reduce the active attention of the succeeding traffic's driver in response to an immediate warning signal of the braking action of the preceding traffic unless said driver puts aside all other matters of interest to a running car and concentrates solely on what the preceding traffic will turn up instantly, the driver's preparedness in response to the braking indication of the preceding traffic would be further reduced by taking into account such distractions as fatique, passenger disturbance, and the scenery on the roadside; so it can be said that the braking action to be taken by a driver in response to the braking indication of a preceding traffic is mostly done in a state of sudden recognition thereof. Authoritatively conducted tests have shown that there is averagely a lag in the order of 0.8–1 second for an ordinary driver to react in response to a sudden information as compared to an immediate information, with variations due to personal alertness and actual status quo, this average lag of 0.8–1 second timed by speed of the car, say, 90 Km per hour, would have pulled the car ahead for a distance of 20–25 m, almost half as far as the presumed safety clearance, so it can be concluded that a lag of time for reaction as short as 0.8–1 second for a driver to effect an immediate braking action in response to the braking action of a preceding traffic would become aggravated to be a matter of life and death, so it should become clear that admittedly to keep at a safety distance is a good policy to avoid longitudinal collisions, yet a means to provide with the soonest possible warning signals of a traffic executing a braking action in driving for the following traffic, even a fraction of a second faster, would also help a great deal to prevent traffic collisions.

Then the question lies in how to keep the driver informed as soon as possible, or even instantly of the braking signal of the preceding traffic, exclusive of the sixth sense, it is common sense that human perception is derived essentially from visual contact, gustatory sense, sense of hearing, taste and tactile senses, for a driver driving a car, he can but keep himself informed of the traffic conditions by means of visual observation and the sense of hearing, whereas the sense of hearing is largely baffled by virtue of the segregation of the body of the car, and therefore the audio braking warning system for automobiles is not recommended because the sound of warning it releases will become indistingusishable with usual horns, and moreover, the loudness of such warning sounds will be greatly reduced before reaching the ears of the drivers of succeeding traffic by the multitude of car bodies involved, in addition, it is not so easy to tell the direction from which the warning sound comes where there are more than just one traffic ahead, and hence, visual faculty is the primary source for detection of specific circumstances for the drivers. If ever that a given car is provided with a strong alarming signal system that will act to unambiguously draw the attention of the drivers of the succeeding traffic while starting to take braking actions, the objective of keeping them instantly informed of the given preceding car on the point of taking braking action will be fulfilled accordingly. Although the red tail light warning signal as provided conventionally on the automobiles will have warning effects while a given car is set at braking, the location of such a warning indicator simply does not fall in a conspicuous position of the perspective of the driver of the succeeding traffic. The perspective range of the driver of the succeeding traffic can be very well compared to be a screen, the red tail light indicator will surely become the focus of attention if placed on a blank screen in the absence of all other objects, but when the surroundings of such a single mark of light indicator are added with the profiles of the body of the car, other traffic bodies, roads, roadside backgrounds and painted with colors, then it would become evident that the mark of warning light indicator would become grossly suppressed owing to the complicated mix-up of the surrounding objects and configurations, for those automobiles with red bodies or painted red in the rear in whole or in part it would be all the more baffling to tell the active status of their red tail warning indicators from a hinder side. The situation becomes even worse at night when the night warning lamp of such a given car is lit on, although the braking warning indicator is usually brighter than the night warning lamp, it would take some time for the driver of the succeeding traffic to tell whether the braking indicator of the preceding traffic is turned on when the preceding traffic comes to be in sight after it has already been turned on, failure to recognize an active braking warning signal of the preceding traffic in time will place the driver of the succeeding traffic together with the car itself and the passengers in a very precarious position indeed.

The present invention, is, therefore, designed to correct the shortcomings of the warning indicators as used on conventional automobiles that would often fail to undeceive drivers of succeeding traffics of their status quo owing to their inconspicuousness and liability to become indistinguishable with an active night warning lamp at night, the chief objective thereof is to provide a readily recognizable braking alarming indication in the midst of the complicated surrounding profiles, views and color-bound configurations within the visual scope of the drivers of the traffic that follow a given preceding traffic thus provided in day-time, said braking alarming indication will be basically different from the night warning lamp as ordinarily provided on the automobiles when put to work in the evening or at night so as to keep number two driver and succeeding drivers instantly or soonest possibly informed of the braking action that is being taken by the preceding traffic so as to take necessary braking action accordingly without affecting the visual coverage of the second and all the succeeding traffic.

A further objective of the present invention is to turn such a braking warning indication into an emergency signal to appeal for help in the event of traffic incidents or road robbery or whatever occasions where rescue is to be solicited.

DISCRIPTION OF THE DRAWING

FIG. 1 gives the three-dimensional view of the present invention.

Figure 2:
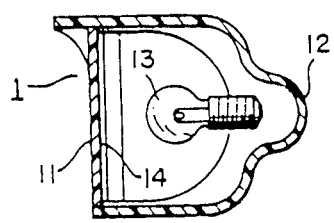

FIG. 2 gives the cross-section view along segment A-A' of FIG. 1.

Figure 3:
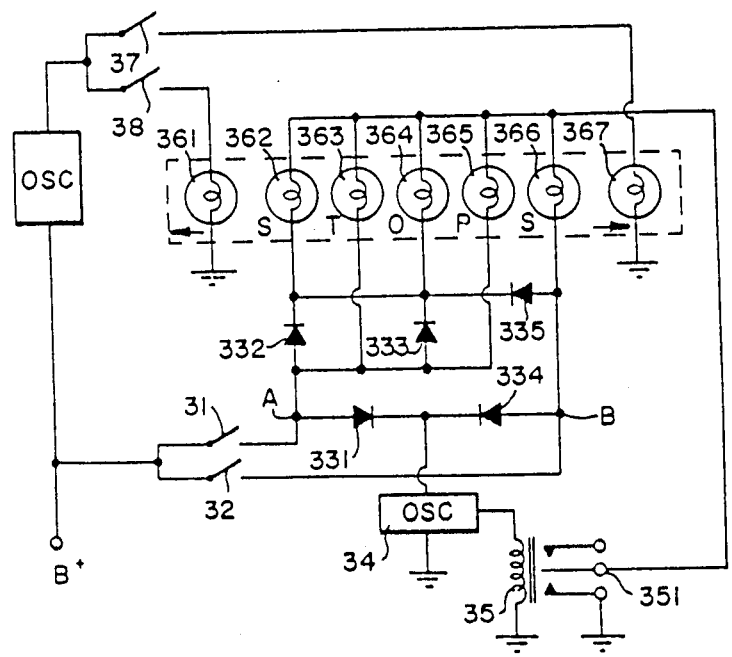

FIG. 3 shows the control circuit of the present invention in execution.

DETAILED DISCRIPTION

Shown in FIG. 1 is the three-dimensional view of the present invention in one execution, covering a demonstration screen 1, a pair of supports 2 and relevant electronic circuits; whereof the screen 1 is fitted to the support footing 2 as a single unit for fixation at a position on the hinder part of a given car such that it will not obstruct the perspective of the driver, the fixation position may vary according to the specific size and model of a given car, it can be on the hinder bumper or in the hinder wind-proof glass provided that such arrangement will in no way obstruct the visual scope of any driver involved, the demonstration face of the screen 1 shall point to the backside to facilitate observation by succeeding traffic drivers, in addition to two direction arrows each pointing to the right and the left directions respectively on both sides of the screen 1, there is provided the word STOPS between both direction arrows, the arrows and the word STOPS will not illuminate except when the car so provided is making turns, braking, subjected to robbery or mechanical faults, that is to say, the demonstration screen will look blank black for the drivers of succeeding traffics under normal conditions thus presents no baffling effects for such other drivers concerned. The detailed structure thereof and the control circuit therefor is given as follows:

Referring to FIG. 2 that gives the cross-section view of FIG. 1 along segment A-A' showing that the demonstration screen 1 is composed of a reflective acrylic board 11, a hood 12, a bulb 13 and a light converging letter body 14; whereof the light converging letter body 14 is made up of right, left direction arrows and the character STOPS, red or golden yellow in color, to be adhered on the interior of the reflective acrylic board 11, to the effect that the lettered word STOPS or direction arrow mark to mate with the bulb in action will be obviously seen from the outside of the reflective acrylic board 11 as the bulb 13 is turned on in a manner that will not affect the front view of the following traffic driver. When the bulb 13 is turned off, the corresponding word STOPS or arrow indications will disappear forthwith to render a blank screen, that amounts to say, to give indication of left turn (←), right turn (→), braking (STOP) or emergency (SOS) on the demonstration screen, all that has to be done is to set on the equivalent setting is given in FIG. 3, whereof one polarity each of the bulb 361, bulb 367, meant respectively to demonstrate the left turn arrow and the right turn arrow is connected to the switch 37, 38 for the left turn and the right turn bulbs respectively, whereas the other polarity for each of them is connected to the common ground, to the effect that when the left/right turn bulb is flashing, the left/right turn arrow on the screen 1 will likewise flash in synchronism thereby still further the warning feature, but which is not the characteristic feature under the present invention. Characteristic of the present invention is the variation of the five letters in display, please refer to FIG. 3 again, wherein switch 31 is the ordinary foot brake switch, whereas switch 32 is executed in pushbutton provided exclusively to release 'help' signal in case of emergency. When brake switch 31 is stepped upon to execute a braking action, the power drive will go to point A by way of junction 31 forthwith and serve to supply the power required for the oscillation of oscillator 34 via diode 331 on the one hand, the oscillator 34 serves to control the skipping of the joint 351 of the relay 35, on the other hand the power drive at point A will also act as the source for four outlets, two of these four outlets will be directly connected to the bulbs 363, 365 that corresponds respectively to the letter 'T' and 'P', the remaining two outlets will be coupled to the bulbs 362,364 that corresponds respectively to the letter 'S' and 'O' by way of diodes 332, 333, with the other polarity of each of the bulbs 362-366 joined in common to the terminal 351 of the relay 35; such an arrangement will serve to turn bulbs 362, 363, 364, 365 that serve to illuminate the combined letters STOP meaning the automobile so provided is taking a brake action to illumination through conduction once the foot brake switch is stepped upon, in the meanwhile these bulbs 362, 363, 364, 365 will flash about to come as flashing signals by virtue of the actions of the oscillator 34 and the relay 35, to sum up, the letter STOP will be transmitted as flashing signals when the foot brake thus is arranged stepped upon so as to warn succeeding drivers of the imminent on-the-way conditions, while all of the foregoing takes place, bulb 366 will remain unlit because of absence of current passage owing to the reverse bias of the diode 334.

In case of rundown, road robbery or other emergency, the emergency pushbutton switch 32 can be pushed on to ask for help, the mechanism works as follows, as power B plus is turned on it will serve to drive the oscillator 34 and the relay 35 to work by way of the diode 334 in one path, while also finds one outlet to the bulb 366 that corresponds to the letter 'S', one outlet to the bulbs 362, 364 each corresponds to the letter 'S' and 'O' respectively by way of the diode 355; Which means that as the emergency switch 32 is acted upon, the letter meaning appeal for help 'SOS' will become illuminated due to conduction of the bulbs 362, 364, 366 that match with each of the three single alphabets 'S' 'O' 'S' respectively, and also, thereupon the mark 'SOS' will be transmitted as flashing signals because the bulbs 362, 364, 366 will all evince flashing effects as a result of the actions of the oscillator 34 and the relay 35, whilst bulbs 363, 365 will remain unlit because of absence of voltage at point A owing to the reverse bias presented by the diode 331.

As regards the dimension of the demonstration screen 1, the principle is that it shall achieve in a clear and appropriate demonstration of the letter marks as covered hereunder, the sample product for the present invention in execution is sized 390 mm long, 80 mm high and 85 mm in depth, with good efficiency in practical applications.

The present invention disclosed so far should appear highly efficient in providing a means to advise the drivers of the succeeding traffic to obtain instantly a warning signal indicating that the preceding traffic is currently taking a braking action, thus react to take braking actions likewise so as to avoid longitudinal collisions in time because the mark 'STOP' that illuminates once the car concerned is set at braking will come as continuous flashes that will become the most conspicuous and eye-catching focus of attention for the following drivers. The originality to use the base letters STOPS on the demonstration screen together with matching circuits to display two warning marks of different ideographic conceptions 'STOP' and 'SOS', both acknowledged internationally is unique and serves to provide as a striking warning device in the event of road hijacking in addition to being used as a signal for help when a vehicle so provided is rundown, and therefore the present invention can be said to be of great value to automobiles and land vehicles everywhere, although that the circuits adopted are within the technical standards of known knowhows, the present invention should not be therefore prejudiced since it can definitely be of great value from an innovatory point of view.

I claim:

1. An electronic braking alarm indicator for automobiles comprising
    a plurality of bulbs, each positioned to light one of the letters S, T, O, P, S on a display screen, said first bulb lighting the first letter S, said second bulb lighting the letter T, said third bulb lighting the letter O, said fourth bulb lighting the letter P, and said fifth bulb lighting the last letter S,
    a voltage source for lighting said bulbs,
    first and second switches connected to said voltage source, said first switch connected to operate with a foot brake of the automobile,
    first unidirectional current means connected in the line from said first switch to said first and third bulbs,
    second unidirectional current means connected to said switches,
    flashing means connected to said second unidirectional current means and to said plurality of bulbs,
    third unidirectional current means connected to said fifth bulb and said first and third bulbs,
    said second switch connected to said fifth bulb and through said third unidirectional means to said first and third bulbs.

2. The electronic braking alarm indicator of claim 1, further characterized by
    said flashing means including
        oscillation means and relay means serially connected to flashingly illuminate the command of either STOP or SOS on said display screen.

3. An electronic braking alarm indicator for automobiles comprising
    a plurality of bulbs, each positioned to light one of the letters S, T, O, P, S on a display screen, said first bulb lighting the first letter S, said second bulb lighting the letter T, said third bulb lighting the letter O, said fourth bulb lighting the letter P, and said fifth bulb lighting the last letter S,
    a voltage source for lighting said bulbs,
    first and second switches connected between said voltage source and said plurality of bulbs,
    unidirectional current means connected to said switches and said bulbs to light said first, second, third, and fourth bulbs upon closing of said first switch and to light said first, third, and fifth bulbs upon closing of said second switch to light up the command of either STOP or SOS on said display screen.

4. The electronic braking alarm indicator of claim 3, wherein
    said unidirectional current means are diodes.

5. The electronic braking alarm indicator of claim 3, further characterized by
    flashing means connected to said switches and to said bulbs.

6. The electronic braking alarm indicator of claim 3, further characterized by
    said unidirectional current means being diodes positioned for nominal current flow in the direction from said voltage source through said first switch to said first and third bulbs, and from said voltage source through said second switch to said first and third bulbs.

7. The electronic braking alarm indicator of claim 6, further characterized by
    said diode from said second switch being positioned as a reverse bias diode means between said first switch and said fifth bulb to prevent lighting of said fifth bulb upon closing of said first switch.

* * * * *